United States Patent

Buma et al.

[11] Patent Number: 5,855,379
[45] Date of Patent: Jan. 5, 1999

[54] CONTROL SYSTEM OF AUTOMOTIVE VEHICLE

[75] Inventors: Shuuichi Buma; Katsuyuki Sano, both of Toyota, Japan

[73] Assignee: Toyota Jidosha Kabushiki Kaisha, Toyota, Japan

[21] Appl. No.: 847,301

[22] Filed: Apr. 24, 1997

[30] Foreign Application Priority Data

Apr. 26, 1996 [JP] Japan ..................................... 8-107986
Dec. 11, 1996 [JP] Japan ..................................... 8-331308

[51] Int. Cl.$^6$ .............................................. B60G 17/015
[52] U.S. Cl. ............................... 280/5.514; 280/124.158; 701/91
[58] Field of Search .................................. 280/6.12, 707, 280/709, 5.514, 6.157, 124.157, 124.158, 124.159, 124.16, 124.161; 303/116.4; 701/37, 71, 91

[56] References Cited

U.S. PATENT DOCUMENTS

| | | | |
|---|---|---|---|
| 4,293,139 | 10/1981 | Brown | 280/707 |
| 4,361,346 | 11/1982 | Harris | 280/709 |
| 4,645,026 | 2/1987 | Adams | 180/132 |
| 5,069,302 | 12/1991 | Kageyama | 280/707 |
| 5,599,073 | 2/1997 | Huh | 280/707 |

FOREIGN PATENT DOCUMENTS 62-166103   7/1987   Japan .

*Primary Examiner*—Paul N. Dickson
*Attorney, Agent, or Firm*—Kenyon & Kenyon

[57] ABSTRACT

A control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein a single source of driving force in the form of an electric motor is adapted in common to the first and second control apparatuses to drive both the first and second fluid pumps.

6 Claims, 13 Drawing Sheets

CONTROL SYSTEM OF AUTOMOTIVE VEHICLE

BACKGROUND OF THE INVENTION

1. Field of the Invention

The present invention relates to a control system of an automotive vehicle, and more particularly to a control system of an automotive vehicle which includes a first control apparatus for adjusting height of the vehicle under control of fluid under pressure supplied from a first fluid pump and a second control apparatus for regulating braking forces applied to a set of road wheels under control of fluid under pressure supplied from a second fluid pump.

2. Description of the Prior Art

In recent years, there has been developed an automatic control system for controlling posture and movement conditions of an automotive vehicle to enhance running stability, controllability and riding comfort of the vehicle. Such an automatic control system includes various kinds of control apparatuses each of which is provided with an electric motor as a source of driving force. As a result, the number of electric motors and their associated parts increase, resulting in difficulty in installation of the control apparatuses, an increase of the vehicle weight, and deterioration of productivity of the vehicle.

SUMMARY OF THE INVENTION

It is, therefore, a primary object of the present invention to provide a control system of an automotive vehicle capable of overcoming the problems discussed above.

According to the present invention, there is provided a control system of an automotive vehicle including a first control apparatus for adjusting height of the vehicle under control of fluid under pressure supplied from a first fluid pump and a second control apparatus for regulating braking forces applied to a set of road wheels of the vehicle under control of fluid under pressure supplied from a second fluid pump, wherein a single source of driving force is adapted in common to the first and second control apparatuses to drive both the first and second fluid pumps.

According to an aspect of the present invention, there is provided a control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein the control system comprises a single source of driving force adapted in common to the vehicle height control apparatus and the brake control apparatus to drive both the first and second fluid pumps, a first electric control apparatus including first detection means for detecting height of the vehicle and first control means responsive to an electric signal from the first detection means for activating the source of driving force and the vehicle height control apparatus in accordance with the detected height of the vehicle, and a second electric control apparatus including second detection means for detecting a rotational condition of the road wheels and movement behavior of the vehicle and second control means responsive to an electric signal from the second detection means for activating the source of driving force and the brake control apparatus in accordance with the detected rotational condition of the road wheels and the detected movement behavior of the vehicle, and wherein the first electric control apparatus further includes means for prohibiting activation of the vehicle height control apparatus for adjustment for rising of the vehicle height while the brake control apparatus is being activated under control of the second electric control apparatus.

In the control system described above, it is preferable that the first electric control apparatus further includes means for exhausting fluid under pressure discharged from the first fluid pump while the brake control apparatus is being activated under control of the second electric control apparatus.

According to another aspect of the present invention, there is provided a control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein the control system comprises a single source of driving force adapted in common to the vehicle height control apparatus and the brake control apparatus to drive both the first and second fluid pumps, a first electric control apparatus including first detection means for detecting height of the vehicle and first control means responsive to an electric signal from the first detection means for activating the source of driving force and the vehicle height control apparatus in accordance with the detected height of the vehicle, and a second electric control apparatus including second detection means for detecting rotation of the road wheels and second control means responsive to an electric signal from the second detection means for activating the source of driving force and the brake control apparatus when the road wheels tend to be locked or slip, and wherein the first electric control apparatus further includes means for prohibiting activation of the vehicle height control apparatus for adjustment for rising of the vehicle height while the brake control apparatus is being activated under control of the second electric control apparatus.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
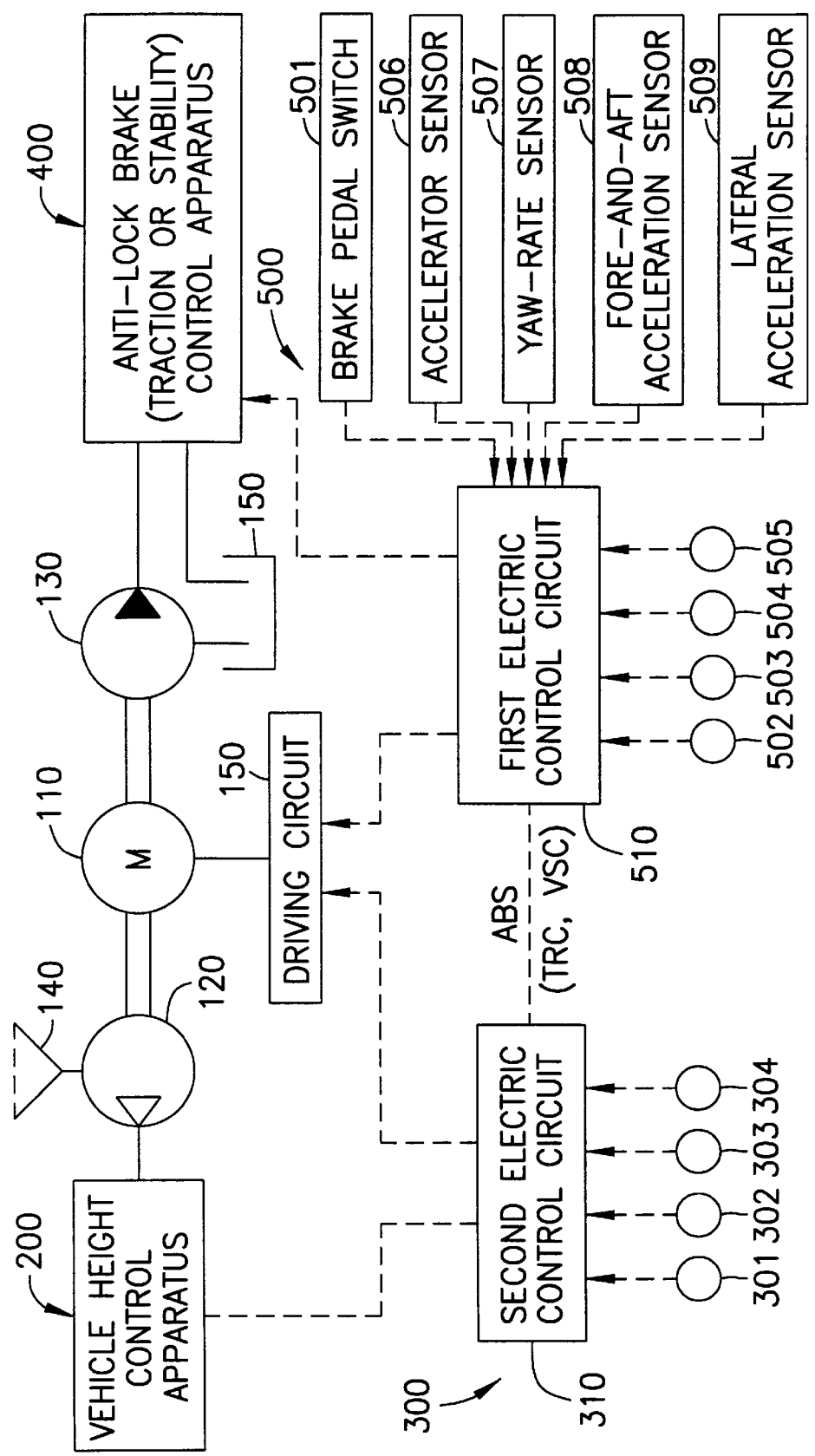
FIG. 1 is a schematic illustration of a control system of an automotive vehicle in accordance with the present invention.

In FIG. 1 of the drawings, there is schematically illustrated a control system of an automotive vehicle according to the present invention which includes an electric motor 110 and pneumatic and hydraulic pumps 120 and 130 in drive connection to a rotation shaft of the electric motor 110. The pneumatic pump 120 is driven by the electric motor 110 to suck the atmospheric air through a filter 140 thereby to supply compressed air to a pneumatic vehicle height control apparatus 200. The electric motor 110 and pneumatic vehicle height control apparatus 200 are activated under control of a first electric control apparatus 300. The hydraulic pump 130 is driven by the electric motor 110 to pump up hydraulic fluid from a fluid reservoir 150 thereby to supply hydraulic fluid under pressure to a hydraulic anti-lock brake control apparatus 400 which is activated under control of a second electric control apparatus 500 to prevent a set of road wheels of the vehicle from locking in braking operation.

Figure 2:
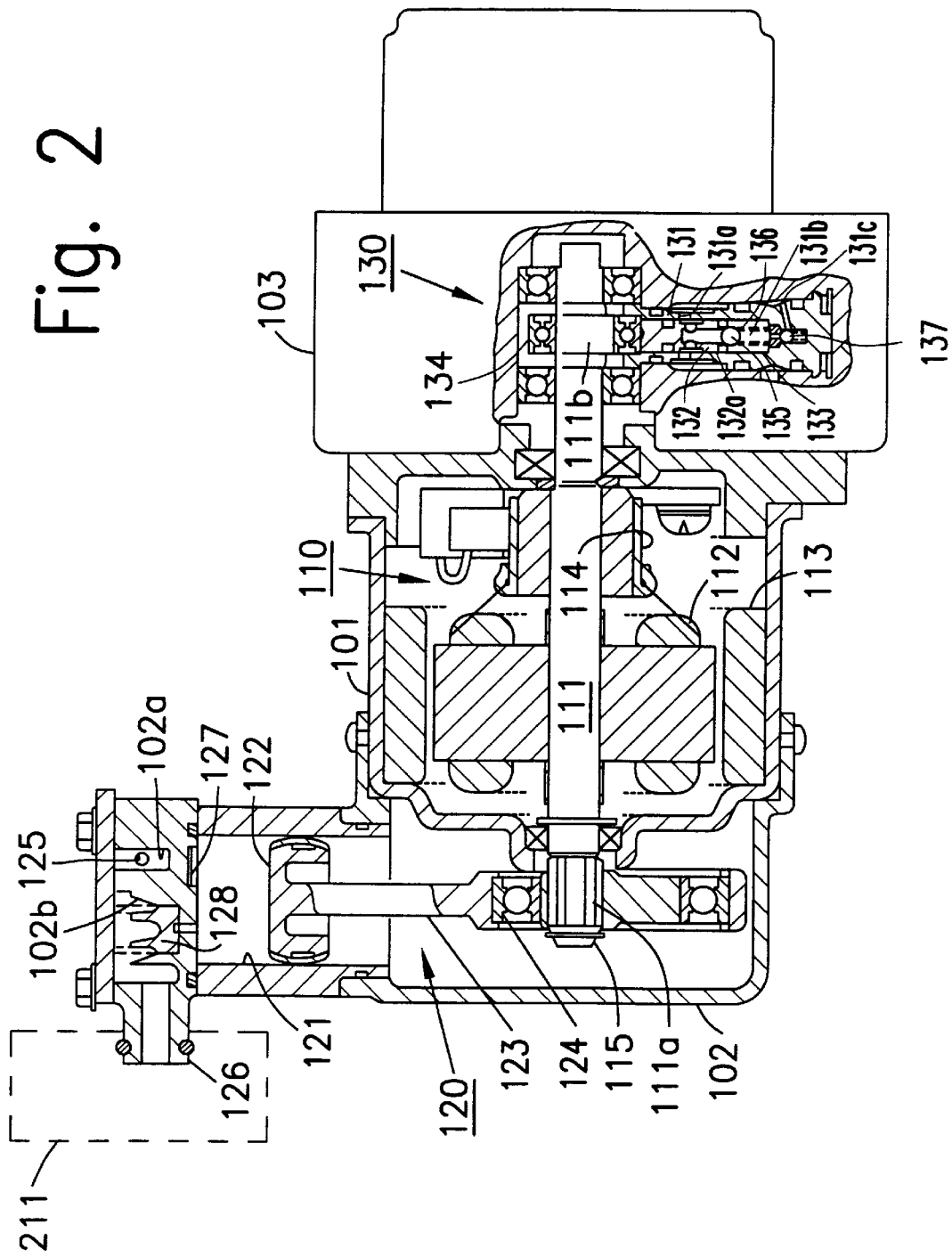
FIG. 2 is a partially broken sectional view of an assembly of an electric motor, a pneumatic pump and a hydraulic pump shown in FIG. 1.

As shown in FIG. 2, the electric motor 110, pneumatic pump 120 and hydraulic pump 130 are contained respectively in housing sections 101, 102 and 103 which are integrally assembled with each other. The electric motor 110 includes a rotor 112 composed of an iron core mounted on the rotation shaft 111 for rotation therewith and a coil wound around the iron core, a stator 113 composed of a cylindrical permanent magnet fixedly coupled within the housing section 101 in surrounding relationship with the rotor 112 and a commutator 114 mounted on the rotation shaft 111 for rotation therewith. The electric motor 110 is activated by current supplied thereto under control of a driving circuit 160 shown in FIG. 1. The rotation shaft 111 is rotatably mounted within the housing section 101 and has opposite ends extending into the housing sections 102 and 103.

The pneumatic pump 120 includes an upright cylinder 121 mounted on the housing section 102 and a piston 122 slidably coupled within the cylinder 121 in an air-tight manner. A piston rod 123 integrally formed with the piston 122 is connected to the rotation shaft 111 through an eccentric ball-bearing 124 to be reciprocated in a vertical direction. The eccentric ball-bearing 124 Is engaged at its inner periphery with an outer spline formed on one end portion of rotation shaft 111 and is retained in place by a fastening bolt 115.

The upper end of upright cylinder 121 is closed by an head block mounted thereon in an air-tight manner. The head block is formed with a suction passage 102a connected to the filter 140 through an intake pipe 125 and a discharge passage 102b connected to a dryer 211 through an outlet port 126. An inlet valve 127 in the form of a relief valve is provided within the head block at an outlet of the suction passage 102a to permit only suction of the air. An outlet valve 128 of the piston type is provided within the head block at an inlet of the discharge passage 102b to permit only discharge of the air. With the components assembled within the head block, the pneumatic pump 120 acts to suck the air from the Intake pipe 125 in reciprocating motion of the piston 122 and to discharge the sucked air into the dryer 211 from the outlet port 126.

The hydraulic pump 130 includes a sleeve 131 fixedly mounted within the housing 103 and a spool 132 slidably coupled within the sleeve 131 in a liquid-tight manner. The spool 132 is loaded upward by a coil spring 133 and engaged with a ball-bearing 134 which is coupled with a cam portion 111b formed on the other end portion of rotation shaft 111 to reciprocate the spool 131 during rotation of the rotation shaft 111. The other end portion of rotation shaft 111 is rotatably supported by a pair of axially spaced ball-bearings mounted within the housing 103. The spool 132 is formed with an axial bore 132a opened at its lower end and a pair of radial holes for providing a fluid communication of the axial bore 132a with a pair of inlet ports 131a formed in the sleeve 131. The inlet ports 131a of sleeve 131 are communicated with a fluid reservoir 150 through a conduit (not shown). The spool 132 is engaged at its lower end with a ball valve 135 contained in a fluid chamber 131b in sleeve 131. The ball valve 135 is loaded upward by means of a coil spring 136 to permit the flow of hydraulic fluid from the inlet ports 131a into the fluid chamber 131b when the spool 132 is moved upward and to interrupt the flow of hydraulic fluid from the fluid chamber 131b into the inlet ports 131a when the spool is moved downward. A valve seat and a spring loaded check valve 137 are disposed between the fluid chamber 131b and an outlet port 131c formed in the lower portion of spool 131. When the spool 132 is moved downward, the check valve 137 is opened to permit the flow of hydraulic fluid discharged therethrough from the fluid chamber 131 into the outlet port 131c. When the spool 132 is moved upward, the check valve 137 is closed to interrupt the reverse flow of hydraulic fluid from the outlet port 131c into the fluid chamber 131b. In the hydraulic pump 130, the hydraulic fluid from inlet ports 131a is pumped by reciprocating motion of the spool 132 and discharged into the outlet port 131c through the check valve 137.

Figure 3:
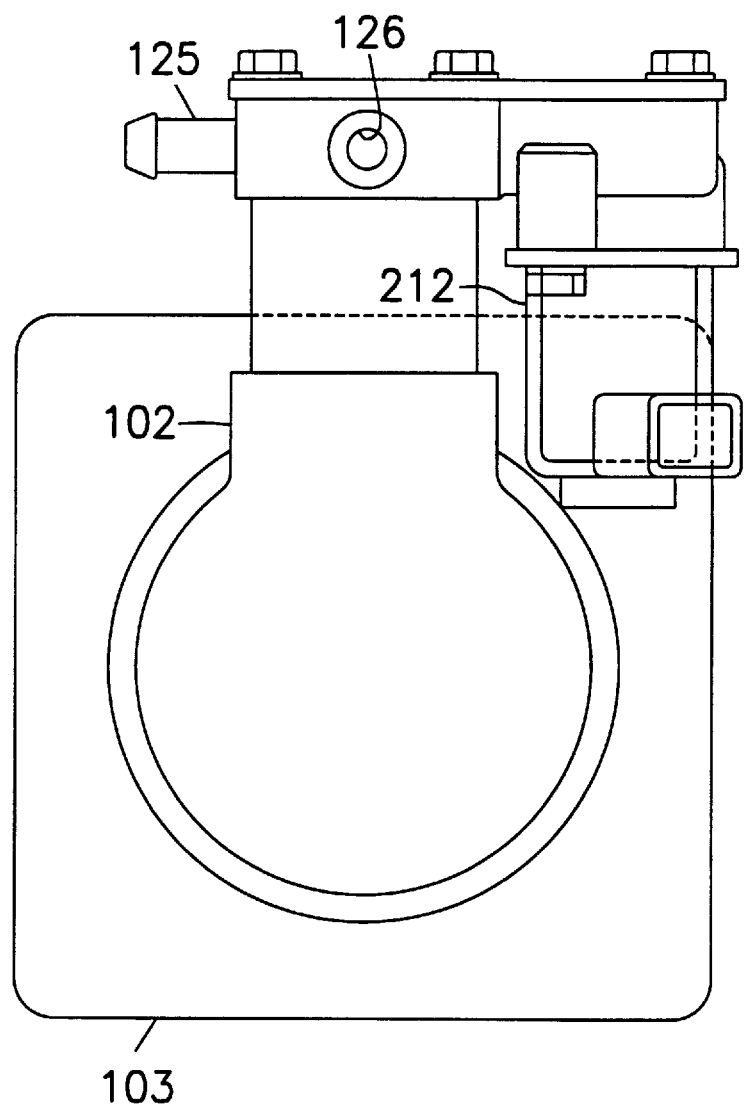
FIG. 3 is a left-hand side view of the assembly of the elector motor and pumps shown in FIG. 2.
Figure 4:
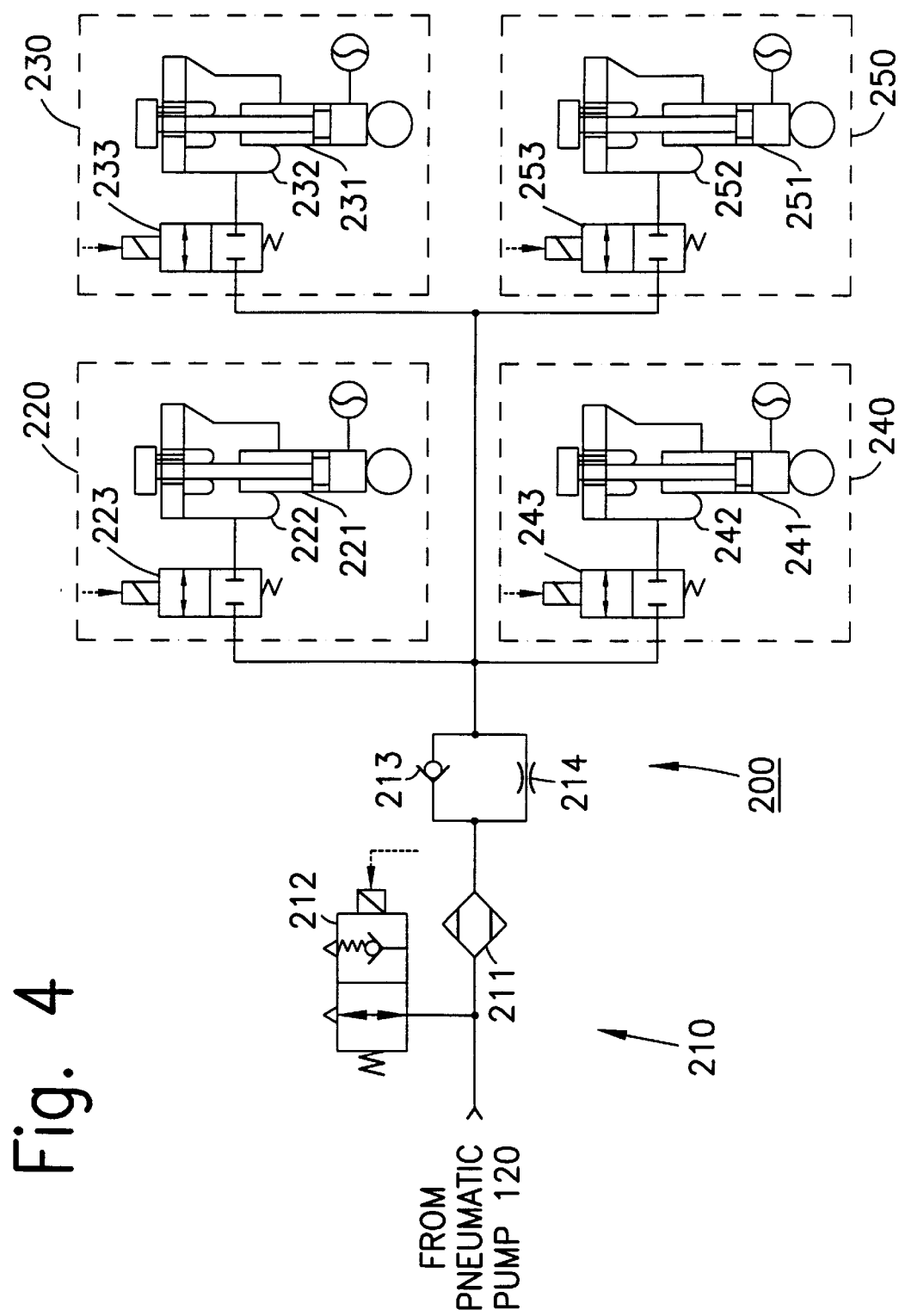
FIG. 4 is a schematic illustration of a pneumatic vehicle height control apparatus shown in FIG. 1.

As shown in FIG. 4, the pneumatic vehicle height control apparatus 200 includes an intake-exhaust device 210 for control of compressed air supplied to and discharged from suspension mechanisms 220, 230, 240 and 250 for a set of front road wheels and a set of rear road wheels of the vehicle. The intake-exhaust device 210 includes the dryer 211 connected to the outlet port 126 of pneumatic pump 120 and an electromagnetic changeover valve 212 connected to a communication passage between the outlet port 126 and dryer 211. As shown in FIG. 3, the electromagnetic changeover valve 212 is mounted on the housing section 102 and is normally retained in a first position under load of a spring to communicate the passage between the outlet port 126 and dryer 211 with the atmospheric air. When energized, the changeover valve 212 is switched over from the first position to a second position to interrupt the communication of the passage between the outlet port 126 and dryer 211 with the atmospheric air. The changeover valve 212 includes a relief valve which acts to permit the air discharged therethrough from the passage between the outlet port 126 and dryer 211 when the pressure in the passage is increased in excess. The dryer 221 has an outlet port connected to the suspension mechanisms 220, 230, 240 and 250 through a check valve 213 and an orifice 214 provided in parallel.

The suspension mechanisms 220, 230, 240 and 250 include shock absorbers 221, 231, 241, 251 respectively provided with air chambers 222, 232, 242, 252. The shock absorbers 221, 231, 241, 251 are interposed between each road wheel and the vehicle body structure in a usual manner to absorb vibration of the vehicle. The air chambers 222, 232, 242, 252 act to adjust the vehicle height at each road wheel in accordance with an amount of compressed air supplied thereto. The air chambers 22, 232, 242, 252 are connected to the check valve 213 and orifice 214 through electromagnetic changeover valves 223, 233, 243. 253, respectively. When maintained in a deenergized condition, the changeover valves 223, 233, 243, 253 are retained in their first positions to interrupt the communication of the air chambers 222, 232, 242, 252 with the check valve 213 and orifice 214. When energized, the changeover valve 223, 233, 243, 253 are switched over from their first positions to their second positions to permit the communication of the air chambers 222, 232, 242, 252 with the check valve 213 and orifice 214.

Figure 6:
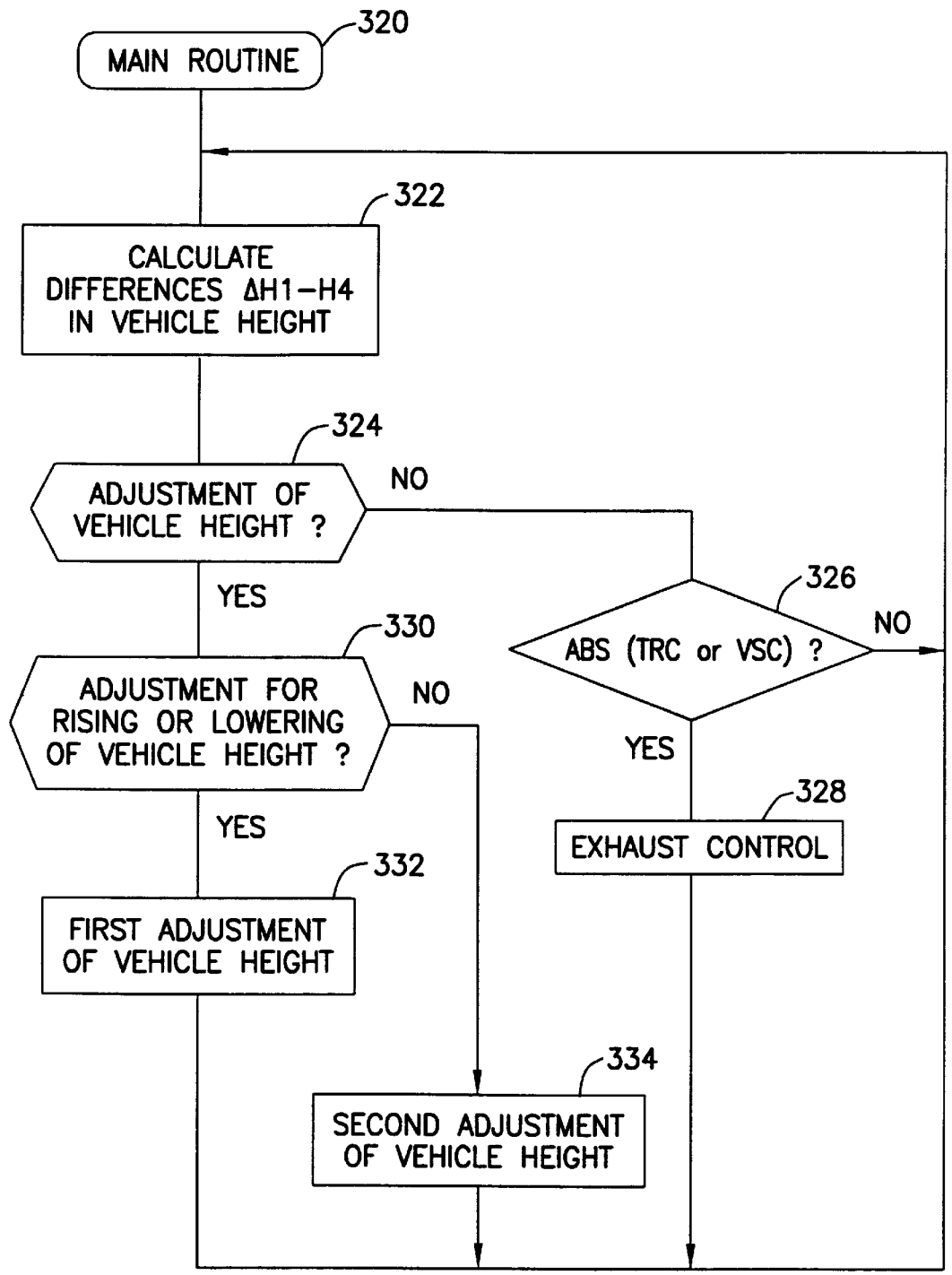
FIG. 6 is a flow chart of a main control program executed by an electric control circuit in the form of a microcomputer for the vehicle height control apparatus.

As shown in FIG. 1, the electric control apparatus 300 for the pneumatic vehicle height control apparatus 200 includes an electric control circuit 310 in the form of a microcomputer connected to vehicle height sensors 301, 302, 303, 304 which are arranged to detect vehicle height at the respective road wheels for producing electric signals indicative of the detected vehicle height values H1, H2, H3, H4. The electric control circuit 310 is programmed to execute control programs shown by flow charts in FIGS. 6, 7 and 8. The driving circuit 160 is connected to the electric control circuit 310 to activate the electric motor 110 under control of the electric control circuit 310.

Figure 5:
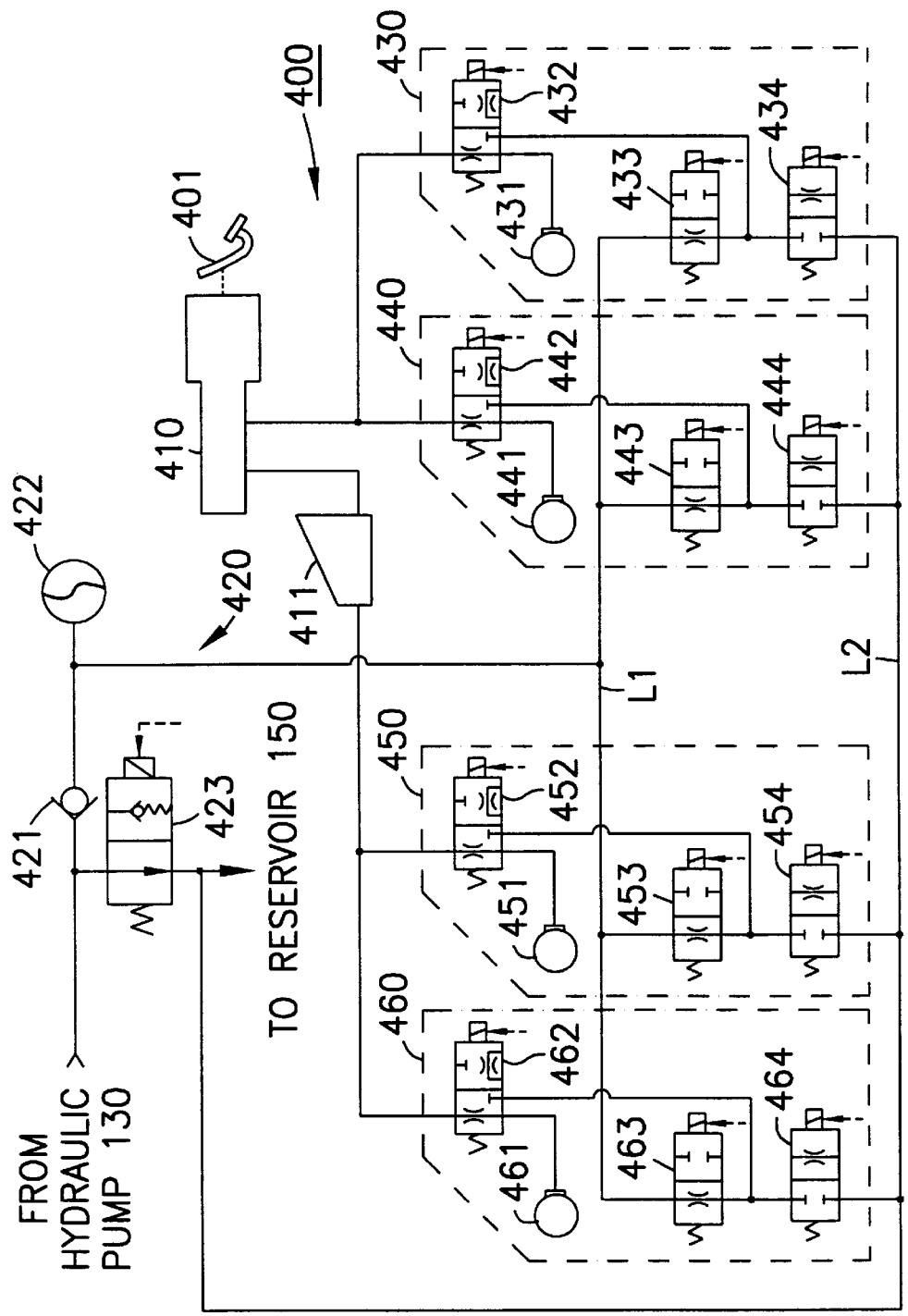
FIG. 5 is a schematic illustration of a hydraulic anti-lock brake control apparatus shown in FIG. 1.

As shown in FIG. 5, the hydraulic anti-lock brake control apparatus 400 includes a master cylinder 410 connected to a brake pedal 401, an intake-exhaust device 420 for controlling the hydraulic fluid under pressure supplied to and discharged from a set of brake control devices 430, 440, 450 and 460 for front and rear wheel brake cylinders 431, 441, 451, 461. The master cylinder 410 has a first outlet port connected to the brake control devices 430 and 440 to supply hydraulic fluid under pressure to the wheel brake cylinders 431 and 441 in response to depression of the brake pedal 401 and a second outlet port connected to the brake control devices 450 and 460 through a proportioning valve 411 to supply hydraulic fluid under pressure to the wheel brake cylinders 451 and 461 under control of the proportioning valve 411 in response to depression of the brake pedal 401.

The intake-exhaust device 420 includes an accumulator 422 connected to the hydraulic pump 130 through a check valve 421 and an electromagnetic changeover valve 423 connected to a communication passage between the hydraulic pump 130 and check valve 421. The changeover valve 423 is retained in a first position under load of a spring to communicate the passage between the hydraulic pump 130 and check valve 421 with a fluid reservoir 150. When energized, the changeover valve 423 is switched over from the first position to a second position to interrupt the communication of the fluid reservoir 150 with the passage between the hydraulic pump 130 and check valve 421. The changeover valve 423 is provided with a relief valve for permitting the flow of fluid into the fluid reservoir 150 from the passage between the hydraulic pump 130 and check valve 421 when the pressure in the passage increases in excess. A high pressure line L1 is connected to the accumulator 422 to be supplied with fluid under high pressure therefrom, while a low pressure line L2 is connected to the fluid reservoir 150.

The brake control devices 430, 440, 450, 460 are provided with electromagnetic changeover valves 432, 442, 452, 462 respectively disposed between the master cylinder 410 and the wheel brake cylinders 431, 441, 451, 461. The changeover valves 432, 442, 452, 462 each are normally retained in their first positions under load of a spring to permit the fluid under pressure supplied therethrough from the master cylinder 410 to the wheel brake cylinders 432, 442, 452, 462. When energized, the changeover valves 432, 442, 452, 462 are switched over to their second positions to interrupt the fluid under pressure from the master cylinder 410 and to communicate the wheel brake cylinders 431, 441, 451, 461 with changeover valves 433, 443, 453, 463 for pressure increase and changeover valves 434, 444, 454, 464 for pressure reduction.

The changeover valves 433, 443, 453, 463 each are normally retained in their first positions to communicate the high pressure line L1 with the changeover valves 432, 442, 452, 462. When energized, the changeover valves 433, 443, 453, 463 are switched over to their second positions to interrupt the communication of the high pressure line L1 with the changeover valves 432, 442, 452, 462. The changeover valves 434, 444, 454, 464 each are normally retained in their first positions to interrupt each communication of the changeover valves 432, 442, 452, 462 with the low pressure line L2. When energized, the changeover valves 434, 444, 454, 464 are switched over to their second positions to permit the communication of the changeover valves 432, 442, 452, 462 with the low pressure line L2.

As shown in FIG. 1, the electric control apparatus 500 for the anti-lock brake control apparatus 400 includes an electric control circuit 510 in the form of a microcomputer connected to a brake pedal switch 501 and wheel speed sensors 502, 503, 504, 505. The brake pedal switch 501 is normally retained in an open position to detect depression of the brake pedal 401. The wheel speed sensors 502, 503, 504, 505 are arranged to detect each rotation speed of the road wheels. The electric control circuit 510 is programed to execute a control program (not shown) for control of the electric motor 110 and the hydraulic anti-lock brake control apparatus 400 in response to electric signals applied from the wheel speed sensors 502, 503, 504, 505 in such a manner as to prevent the road wheels from locking in depression of the brake pedal 401. During activation of the electric motor 110 and the hydraulic anti-lock brake control apparatus 400, the electric control circuit 510 applies a control signal ABS for control of the hydraulic anti-lock brake control apparatus 400 to the electric control circuit 310 for the pneumatic vehicle height control apparatus 200.

Hereinafter, operation of the control system of the vehicle will be described in detail. Assuming that the brake pedal 401 has been depressed during traveling of the vehicle, the wheel brake cylinders 431, 441, 451, 461 are operated by fluid under pressure supplied from the master cylinder 410 through the changeover valves 432, 442, 452, 462. If in such braking operation, the road wheels tend to be locked on a slippery road surface, the electric control circuit 510 for the anti-lock brake control apparatus produces a control signal therefrom in response to electric signals applied from the brake pedal switch 501 and wheel speed sensors 502–505 and applies it to the driving circuit 160 and the changeover valves 432, 442, 452, 462. In turn, the electric motor 110 is activated under control of the driving circuit 160, and the changeover valves 432, 442, 452, 462 are switched over to their second positions to interrupt the flow of fluid under pressure from the master cylinder 410. Thus, the hydraulic pump 130 is operated by the electric motor 110 to supply fluid under pressure to the accumulator 422 through the check valve 421 and to the high pressure line L1, while the wheel brake cylinders 431, 441, 451, 461 are selectively connected to the low pressure line L2 or high pressure line L1 under control of the changeover valves 433, 443, 453, 463 and 434, 444, 454, 464. If the road wheel braked by operation of the wheel brake cylinder 431 (441, 451 or 461) tends to be locked, the changeover valves 433 (443, 453 or 463) and 434 (444, 454 or 464) are switched over to their second positions under control of the electric control circuit 510 to connect the wheel brake cylinder 431 (441, 451 or 461) to the low pressure line L2 through the changeover valves 432 (442, 452 or 462) and 434 (444, 454 or 464). This is effective to avoid the road wheel from locking. When the road wheel is avoided from locking, the changeover valves 433 (443, 453 or 463) and 434( 444, 454 or 464) are switched over to their first positions under control of the electric control circuit 510 to connect the wheel brake cylinder 431 (441, 451 or 461) to the high pressure line L1 through the changeover valves 433 (443, 353 or 463) and 432 (442, 452 or 462).

While the changeover valves 432–434, 442–444, 452–454 and 462–464 are operated under control of the electric control circuit 510 to control the hydraulic braking pressure applied to the wheel brake cylinders 431, 441, 451 and 461 in such a manner as to avoid the road wheels from locking, the electric control circuit 310 for the vehicle height control apparatus 200 is applied with an electric signal ABS indicative of activation of the electric motor 110 and hydraulic anti-lock brake control apparatus 400. When an ignition switch (not shown) of the vehicle has been closed, the electric control circuit 310 for the vehicle height control apparatus is activated to initiate execution of a main control routine shown by a flow chart in FIG. 6. The electric control circuit 310 reads out at step 322 electric signals indicative of vehicle height values H1–H4 at the road wheels from the vehicle height sensors 301–304 to calculate each difference $\Delta H1$–$\Delta H4$ of the detected vehicle height values H1–H4 relative to a standard vehicle height value 110. At the following step 324, the electric control circuit 310 determines whether or not each absolute value of the calculated differences $\Delta H1$–$\Delta H4$ is less than a predetermined small value $\epsilon$ representing necessity for control of the vehicle height. If the answer at step 324 is "No", the electric control circuit 310 determines at step 326 whether the electric signal ABS is being applied from the electric control circuit 510 or not. If the answer at step 326 is "No", the electric control circuit 310 repeats the processing at step 322, 324 and 326. If the answer at step 326 is "Yes", the electric control circuit 310 executes processing for exhaust control at step 328 during which the changeover valve 212 of FIG. 4 is retained in the first position to exhaust the air from the pneumatic pump 120. This is useful to reduce the load acting on the electric motor 110 in operation of the hydraulic pump 130.

When determined a "Yes" answer at step 324, the electric control circuit 310 determines at step 330 whether adjustment for rising or lowering of the vehicle height is required at all the road wheels or whether adjustment for rising of the vehicle height is required at any one of the road wheels while adjustment for lowering of the vehicle height is required at the other road wheels. When adjustment for rising or lowering of the vehicle height is required at all the road wheels, the electric control circuit 310 determines a "Yes" answer at step 330 and executes at step 332 a first vehicle height control routine shown by a flow chart in FIG. 7. When adjustment for rising of the vehicle height is required at any one of the road wheels while adjustment for lowering of the vehicle height is required at the other road wheels, the electric control circuit 310 determines a "No" answer at step 330 and executes at step 334 a second vehicle height control routine shown by a flow chart in FIG. 8.

Figure 7:
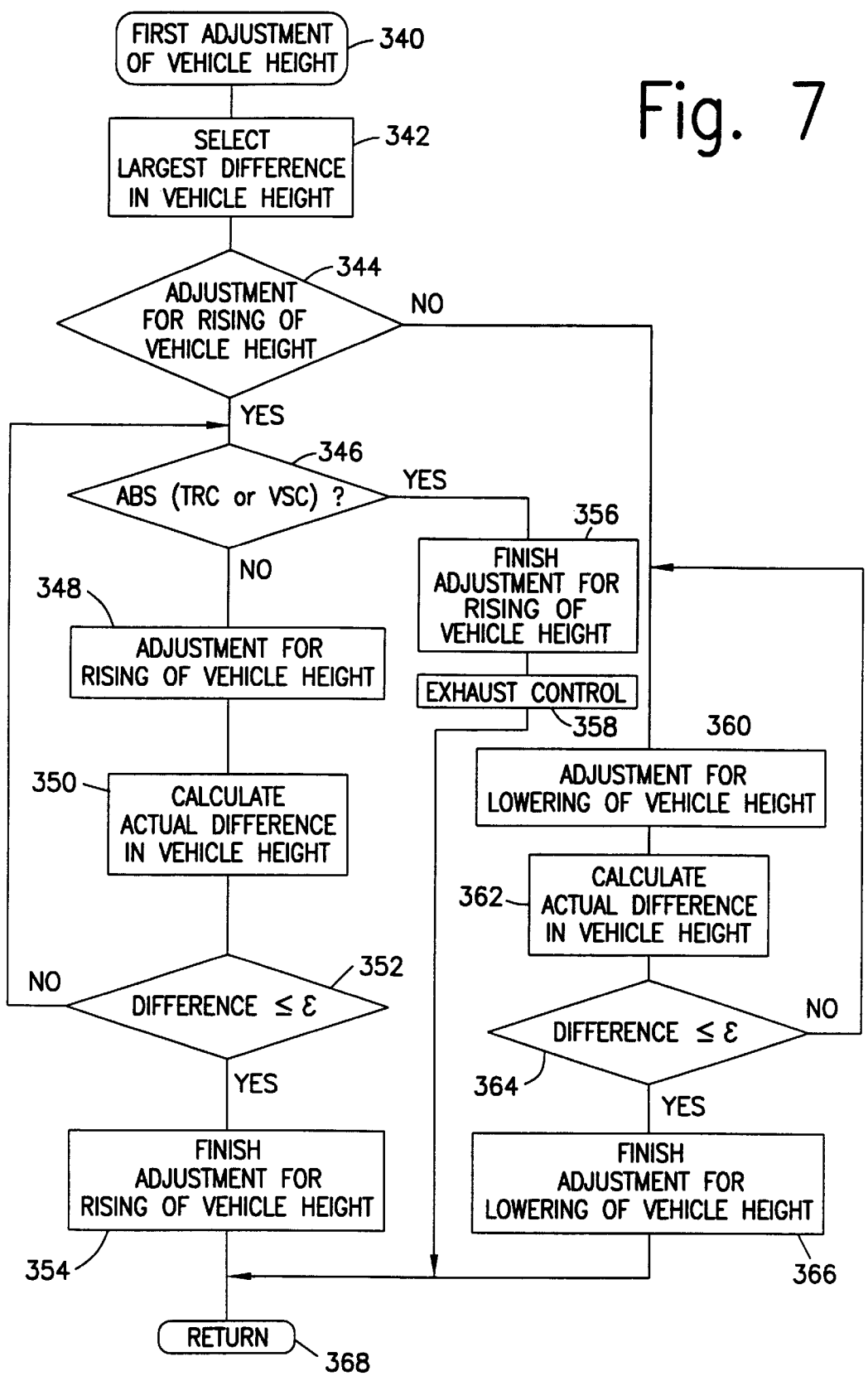
FIG. 7 is a flow chart of a first vehicle height control routine shown in FIG. 6.

In execution of the first vehicle height control routine, the electric control circuit 310 starts at step 340 in FIG. 7 to execute the program and selects a largest difference value from absolute values of the calculated differences $\Delta H1$–$\Delta H4$ in vehicle height. Subsequently, the electric control circuit 310 determines at step 344 whether a sign of the selected largest difference value is positive or negative. If the sign of the selected largest difference value is positive, the electric control circuit 310 causes the program to proceed to step 346 and executes processing for adjustment for rising of the vehicle height at the following step 348. If the sign of the selected largest difference value is negative, the electric control circuit 310 causes the program to proceed to step 360 and executes processing for adjustment for lowering of the vehicle height at step 360.

At step 346, the electric control circuit 310 is responsive to the electric signal ABS from the electric control circuit 510 to determine whether the hydraulic anti-lock brake control apparatus 400 is being activated under control of the electric control circuit 510 or not. If the hydraulic anti-lock brake control apparatus 400 is inoperative, the electric control circuit 310 executes processing at step 348–352 to control rising of the vehicle height at the road wheel where the largest difference value was selected. During adjustment for rising of the vehicle height, the electric control circuit 310 activates the electric motor 110 and changeover valve 212 at step 348. Thus, the hydraulic pump 120 is operated by the electric motor 110 to discharge compressed air, and the changeover valve 212 is switched over to the second position to permit the compressed air supplied into the suspension mechanisms 220, 230, 240 and 250 through the dryer 211 and check valve 213. Subsequently, the electric control circuit 310 activates at step 348 the changeover valve 223 (233, 243 or 253) in the suspension mechanism 220 (230, 240 or 250) at the road wheel. Thus, the changeover valve 223 (233, 243 or 253) is switched over to the second position to supply the compressed air to the air chamber 222 (232, 242 or 252) therethrough so that the vehicle body is raised by the compressed air supplied into the air chamber 222 (232, 242 or 252).

After processing at step 348, the electric control circuit 310 reads out at step 350 the vehicle height value H1 (H2, H3 or H4) at the road wheel from the vehicle height sensor 301 (302, 303 or 304) to calculate a difference $\Delta H1$ ($\Delta H2$, $\Delta H3$ or $\Delta H4$) of the vehicle height value H1 (H2, H3 or H4) relative to the standard height 110. Subsequently, the electric control circuit 310 compares an absolute value of the calculated difference $\Delta H1$ ($\Delta H2$, $\Delta H3$ or $\Delta H4$) with the predetermined small value $\epsilon$ and continues to execute the processing at step 346–352 until the absolute value of the calculated difference becomes less than the predetermined small value $\epsilon$. When the absolute value of the calculated difference $\Delta H1$ ($\Delta H2$, $\Delta H3$ or $\Delta H4$) becomes less than the predetermined small value $\epsilon$, the electric control circuit 310 determines a "Yes" answer at step 352 and executes at step 354 processing for finishing the adjustment for rising of the vehicle height. During execution of the processing at step 354, the electric control circuit 310 deactivates the changeover valve 223 (233, 243 or 253) and the electric motor 110. As a result, the compressed air supplied into the air chamber 222 (232, 242 or 252) is confined to maintain the vehicle height H1 (H2, H3 or H4) at the standard height HO. After processing at step 354, the electric control circuit 310 returns the program to step 322 of FIG. 6 at step 368.

If the hydraulic anti-lock brake control apparatus 400 is activated under control of the electric control circuit 510 before or during adjustment for rising of the vehicle height, the electric control circuit 310 determines a "Yes" answer at step 346 in response to the electric signal ABS applied from the electric control circuit 510 and executes at step 356 the same processing for finishing the adjustment for rising of the vehicle height as that at step 354. Thus, the adjustment for rising of the vehicle height is prohibited during activation of the hydraulic anti-lock brake control apparatus 400. After processing at step 356, the electric control circuit 310 executes at step 358 the same processing for exhaust control as that at step 328 so that the changeover valve 212 is retained in the first position to reduce the load acting on the electric motor 110.

If adjustment for lowering of the vehicle height is required, the electric control circuit 310 determines a "No" answer at step 344 and executes processing at step 360–364 to lower the vehicle height at the road wheel where the largest difference ΔH1 in vehicle height was detected. During the adjustment for lowering of the vehicle height, the electric control circuit 310 deactivates at step 360 the changeover valve 212 and activates the changeover valve 223 (233, 243 or 253) in the suspension mechanism 220 (230, 240 or 250). Thus, the changeover valve 223 (233, 243 or 253) is switched over to the second position to exhaust the air from the air chamber 222 (232, 242 or 252) into the atmosphere through the orifice 214, dryer 211 and changeover valve 212. The processing at step 360 is continued until an absolute value of the difference ΔH1 (ΔH2, ΔH3 or ΔH4) becomes less than the small value ε by processing at step 362 and 364. When the absolute value of the difference ΔH1 (ΔH2, ΔH3 or ΔH4) becomes less than the small value ε, the electric control circuit 310 determines a "Yes" answer at step 364 and executes processing for finishing the adjustment for lowering of the vehicle height at step 366. During the processing at step 366, the electric control circuit 310 deactivates the changeover valve 223 (233, 243 or 253) to close the air chamber 222 (232, 242 or 252) so that the vehicle height H1 (H2, H3 or H4) at the road wheel is retained at the standard height H0.

Figure 8:
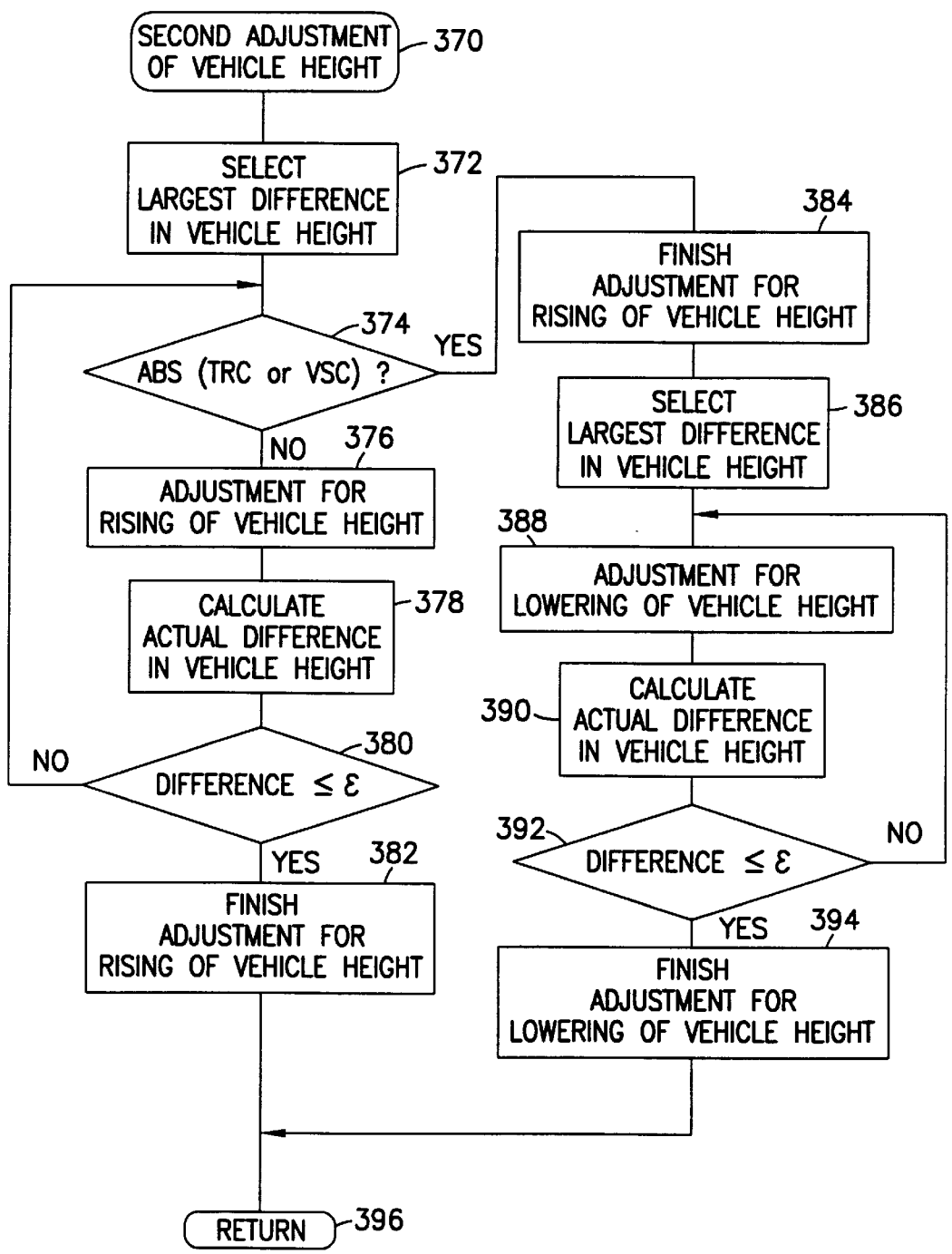
FIG. 8 is a flow chart of a second vehicle height control routine shown in FIG. 6.

In the second vehicle height control routine shown in FIG. 8, the electric control circuit 310 starts at step 370 to execute the program and selects a largest difference value from absolute values of the calculated differences ΔH1, ΔH2, ΔH3 and ΔH4 at the road wheels to be adjusted by rising of the vehicle height. Thereafter, the electric control circuit 310 executes processing at step 376–382 in the same manner as that at step 348–354 to raise the vehicle height at the road wheel up to the standard height H0. If in this instance, the hydraulic anti-lock brake control apparatus 400 is activated under control of the electric control circuit 510, the electric control circuit 310 determines a "Yes" answer at step 374 in response to the electric signal ABS from the electric control circuit 510 and executes at step 384 the processing for finishing the adjustment for rising of the vehicle height in the same manner as that at step 354.

After processing at step 384, the electric control circuit 310 selects a largest difference value from absolute values of the calculated differences ΔH1, ΔH2, ΔH3 and ΔH4 at the road wheels to be adjusted by lowering of the vehicle height. Thereafter, the electric control circuit 310 executes processing at step 388–394 in the same manner as that at step 360–366 to lower the vehicle height to the standard height H0. During the processing at step 388–394, the changeover valve 212 is deactivated by processing at step 388 to exhaust the air from the pneumatic pump 120 therethrough. This is useful to reduce the load acting on the electric motor 110 during activation of the hydraulic anti-lock brake control apparatus 400.

As is understood from the above description, the pneumatic pump 120 of the pneumatic vehicle height control apparatus 200 and the hydraulic pump 130 of the hydraulic anti-lock brake control apparatus 400 are driven by the electric motor 110 in common. With such an arrangement of the pneumatic and hydraulic pumps 120 and 130, problems in a mounting space for component parts of the control apparatuses, weight of the vehicle and manufacturing efficiency of the control apparatuses can be solved in a simple manner. Since the pneumatic vehicle height control apparatus 200 is activated before start of the vehicle or during stopping of the vehicle while the hydraulic anti-lock brake control apparatus 400 is activated during traveling of the vehicle, it is not required to operate both the pneumatic and hydraulic pumps 120 and 130 at the same time. For this reason, the electric motor 110 can be utilized in common without causing any problem in each function of both the control apparatuses 200 and 400.

In addition, the hydraulic anti-lock brake control apparatus 400 is usually activated in a condition where the vehicle is traveling on a slippery road the surface of which is wet, frozen or covered with snow. In such a condition, moisture in the atmospheric air tends to be remained in the passage between the pneumatic pump 110 and dryer 211 and in the changeover valve 212, while the hydraulic anti-lock brake control apparatus 400 Is activated at a relatively high frequency. During activation of the hydraulic anti-lock brake control apparatus 400, the housing sections 101–103 are warmed by heat caused by operation of the electric motor 110 and hydraulic pump 130. Thus, the pneumatic pump 110, dryer 211 and changeover valve 212 assembled within the housing section 102 are warmed by the heat, and the remained moisture is vaporized. Particularly, in a condition where the remained moisture is frozen by the atmospheric air of low temperature, the hydraulic anti-lock brake control apparatus 400 is frequently activated during traveling of the vehicle on frozen road surfaces. In such an instance, the remained moisture is warmed by heat caused by operation of the electric motor 110 and hydraulic pump 130 and is released from freezing to ensure normal operation of the pneumatic vehicle height control apparatus 200.

Even when it is required to activate both the vehicle height control apparatus 200 and anti-lock brake control apparatus 400, the adjustment for rising of the vehicle height is prohibited by the processing at step 346, 356 or 374, 384 to ensure operation of the anti-lock brake control apparatus 400. As a result, the anti-lock brake control function is effected prior to the vehicle height control function to ensure traveling stability of the vehicle. This is also useful to provide the electric motor 110 relatively small in size. In addition, even when it is required to activate the anti-lock brake control apparatus 400, the adjustment for lowering of the vehicle height is effected by the processing at step 344 or 386 in a condition where the changeover valve 212 is switched over by the processing at step 326–328, 346–358 or 374–388 to exhaust therethrogh the air from the pneumatic pump 120. This is useful to reduce the load acting on the electric motor 110 during activation of the anti-lock brake control apparatus 400. When the height control apparatus 200 is activated, the changeover valve 423 is retained in the first position as shown in FIG. 5 to permit the hydraulic fluid discharged into the fluid reservoir 150 from the hydraulic pump 130 thereby to reduce the load acting on the electric motor 110.

In the control system of the vehicle described above, the electric control apparatus 500 for the anti-lock brake control apparatus 400 may be modified for traction control of the drive road wheels of the vehicle. In this modification, the electric control apparatus 500 is arranged to control the hydraulic fluid under pressure supplied to and discharged from the wheel brake cylinders 450 and 460 for the rear drive road wheels thereby to prevent the drive road wheels from slipping on a travel road. In the case that the vehicle is of the front-wheel drive type, the electric control apparatus 500 is arranged to control operation of the wheel brake cylinders 430 and 440 In such a manner as to prevent the drive road wheels from slipping.

In the electric control apparatus 500 modified as described above, the electric control circuit 510 is connected to an accelerator sensor 506 in stead of the brake pedal switch 501 and is connected to the wheel speed sensors 502–505. The accelerator sensor 506 is arranged to detect depression of an accelerator pedal (not shown) for start or acceleration of the vehicle. When applied with an electric signal from the accelerator sensor 506, the electric control circuit 510 detects a slip condition of the drive road wheels in response to electric signals from the wheel speed sensors to control each operation of the wheel brake cylinders 450, 460 or 430, 440 when the drive road wheels tend to slip on a travel road. In this case, the electric control circuit 510 produces an electric signal TRC therefrom during operation of the brake control apparatus 400 and applies it to the electric control circuit 310 for the vehicle height control apparatus 200. During such traction control of the vehicle, the electric control circuit 310 determines a "Yes" answer at step 326, 346 or 374 in response to the electric signal TRC.

Since in the first modification, the electric motor 110 is adapted to drive both the pneumatic and hydraulic pumps 120 and 130 respectively for the vehicle height control apparatus 200 and anti-lock brake control apparatus 400, problems in a mounting space for component parts of the control apparatuses 200 and 400, weight of the vehicle and manufacturing efficiency of the control apparatuses can be solved in a simple manner. As the hydraulic anti-lock brake control or traction control apparatus 400 is activated only at start or acceleration of the vehicle, it is not required to operate both the pneumatic and hydraulic pumps 120 and 130 at the same time. Accordingly, the electric motor 110 can be utilized in common without causing any problem in each function of the control apparatuses 200 and 400.

In the control system of the vehicle described above, the electric control apparatus 500 for the anti-lock brake control apparatus 400 may be modified for stability control of the vehicle. In this modification, the electric control apparatus 500 is arranged to control the hydraulic fluid under pressure supplied to and discharged from the wheel brake cylinders 431, 441 and 451, 461 in braking operation in such a manner that the left and right road wheels are applied with different braking forces to avoid abnormal movement behavior of the vehicle such as spin turn or driftout.

In the electric control apparatus 500 modified as described above, the electric control circuit 510 is connected to a yaw rate sensor 507 for detecting a yaw rate of the vehicle, a fore-and-aft accelerator sensor 508 for detecting acceleration of the vehicle in a fore-and-aft direction, and a lateral acceleration sensor 509 for detecting acceleration of the vehicle in a lateral direction. When applied with electric signals from the sensors 507, 508 and 509, the electric control circuit 510 calculates a slip angle and a slip angle speed of the vehicle body on a basis of a yaw rate and acceleration of the vehicle in the fore-and-aft and lateral directions detected by the sensors 507–509 and determines a movement condition of the vehicle based on the calculated slip angle and slip angle speed. If the movement behavior of the vehicle is in an unstable or abnormal condition due to spin turn or drift-out, the electric control circuit 510 acts to control operation of the electric motor 110 and brake control apparatus 400 in such a manner as to stabilize the movement behavior of the vehicle. In this instance, the electric control circuit 510 produces an electric signal VSC therefrom during operation of the brake control apparatus 400 and applies it to the electric control circuit 310 for the vehicle height control apparatus 200. During such control for stability of the vehicle, the electric control circuit 310 determines a "Yes" answer at step 326, 346 or 374 in response to the electric signal VSC.

Since in the second modification, the electric motor 110 is adapted to drive both the pneumatic and hydraulic pumps 120 and 130 respectively for the vehicle height control apparatus 200 and stability control apparatus 400, problems in a mounting space for component parts of the control apparatuses 200 and 400, weight of the vehicle and manufacturing efficiency of the control apparatuses 200 and 400 can be solved in a simple manner. As the hydraulic stability control apparatus 400 is activated only at start or acceleration of the vehicle, it is not required to operate both the pneumatic and hydraulic pumps 120 and 130 at the same time. Accordingly, the electric motor 110 can be utilized in common without causing any problem in each function of the control apparatuses 200 and 400.

Although In the first and second modifications, the electric control circuit 310 of the height control apparatus 200 has been arranged to prohibit the adjustment for rising of the vehicle height during activation of the anti-lock brake control (traction control or stability control) apparatus 400 and to permit only the adjustment for lowering of the vehicle height, the electric control circuit 310 may be arranged to prohibit both the adjustments for rising and lowering of the vehicle height during activation of the anti-lock brake control (traction control or stability control) apparatus 400. In this case, the electric control circuit 310 is programmed to determine whether or not the control apparatus 400 is activated during the processing at step 360–364 of FIG. 7 and to finish the processing for adjustment for lowering of the vehicle height if the answer is "Yes". In addition, the processing at step 386–394 of FIG. 8 is eliminated.

Figure 9:
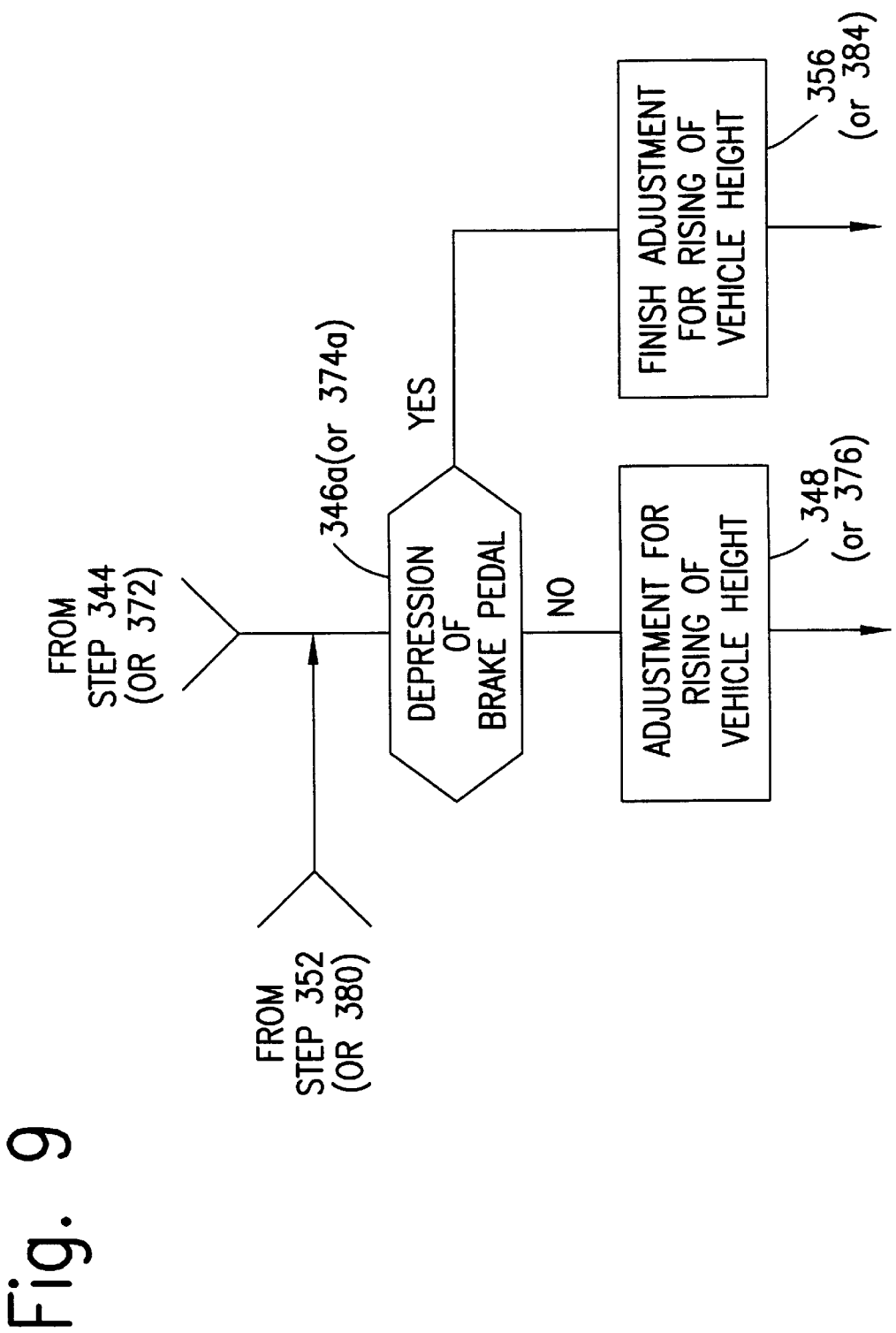
FIG. 9 is a flow chart of a modification of the first or second vehicle height control routine.

Although in the first modification, the electric control circuit 310 has been arranged to prohibit the adjustment for rising of the vehicle in response to the electric signal ABS or TRC, the electric control circuit 310 may be arranged to prohibit the adjustment for rising of the vehicle height in response to braking operation of the vehicle or depression of the accelerator pedal for start or acceleration of the vehicle. In such a modification, the processing at step 346 of FIG. 7 and at step 374 of FIG. 8 is replaced with processing at step 346*a* (or 374*a*) shown in FIG. 9, wherein the electric control circuit 310 is responsive to an electric signal from the brake pedal switch 501 or accelerator sensor 506 to determine whether the brake pedal 401 or the accelerator pedal has been quickly depressed or not. With such an arrangement of the electric control circuit 310, the adjustment for rising of the vehicle height is prohibited prior to activation of the hydraulic anti-lock brake control or traction control apparatus 400. This is useful to prevent the road wheels of the vehicle from locking without delay of a time in operation or to avoid the drive road wheels from slipping at start or acceleration of the vehicle.

Figure 10:
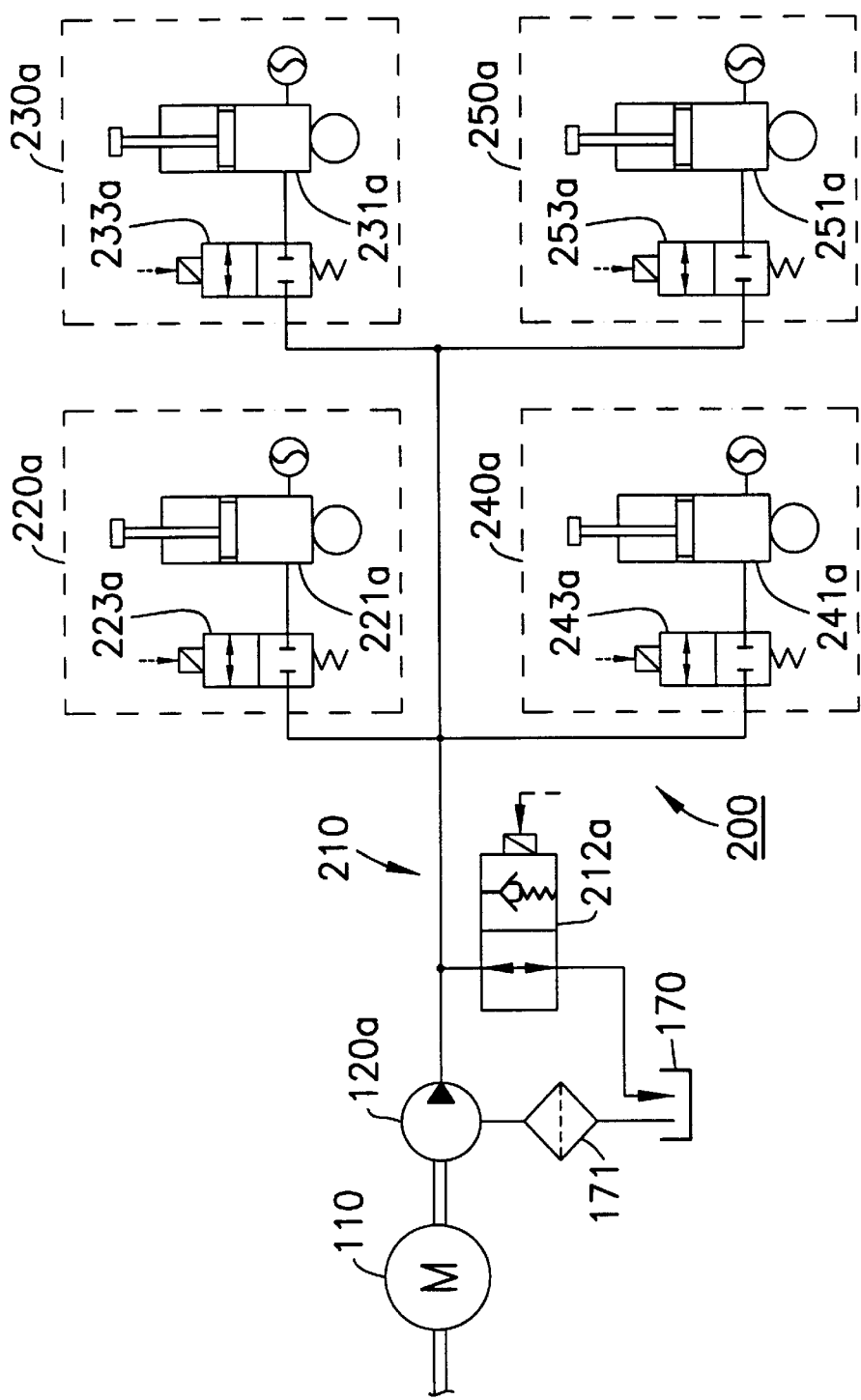
FIG. 10 is a schematic illustration of a modification of the vehicle height control apparatus shown in FIG. 4.

In the automatic control system of the vehicle, the pneumatic vehicle height control apparatus 200 may be replaced with a hydraulic control apparatus as shown in FIG. 10, wherein the pneumatic pump 120 is replaced with a hydraulic pump 120a arranged to pump up hydraulic fluid from a fluid reservoir 170 through a filter 171 for supply of hydraulic fluid under pressure. In this modification, the hydraulic pump 120a is connected to suspension mechanisms 220a, 230a, 240a and 250a, and the changeover valves 223, 233, 243 and 253 are replaced with electromagnetic changeover valves 223a, 233a, 243a and 253a which are arranged to control hydraulic fluid under pressure supplied to and discharged from each lower chamber of shock absorbers 221a, 231a, 241a and 251a. In addition, the changeover valve 212 is replaced with an electromagnetic changeover valve 212a which is disposed between a passage in connection to an outlet port of the hydraulic pump 120a and the fluid reservoir 170. In this modification, the changeover valves 212a, 223a, 233a, 243a and 253a are operated under control of the electric control circuit 310 substantially in the same manner as in the vehicle height control apparatus 200 shown in FIG. 4.

Figure 11:
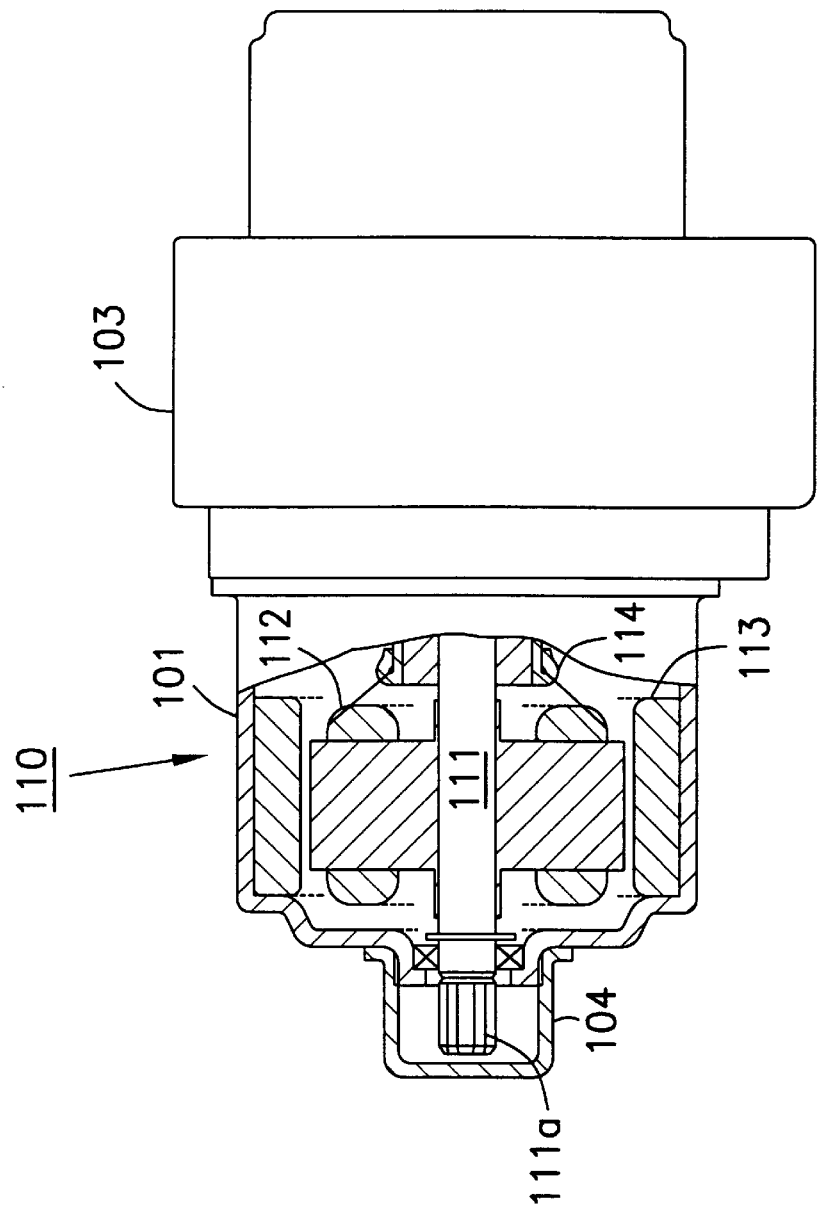
FIG. 11 is a partially broken sectional view of the assembly of the electric motor and hydraulic pump in a condition where the pneumatic pump is removed.

Although in the foregoing embodiment and modifications, the present invention has been adapted to an automotive vehicle provided with the pneumatic or hydraulic vehicle height control apparatus 200 and the hydraulic anti-lock brake control (traction or stability control) apparatus 400, the present invention can be adapted to an automotive vehicle without the provision of the vehicle height control apparatus 200. In such an application of the present invention, the assembly of the second housing section 102 and the pneumatic pump 120 shown in FIG. 2 is removed from the first housing section 101 and the rotation shaft 111 of electric motor 110, and the second housing section 101 is covered with a cap 104 as shown in FIG. 11. Thus, the electric motor 110 and hydraulic pump 130 assembled within the first and third housing sections 101 and 103 can be adapted in common to the vehicle without any change in construction. This useful to reduce the manufacturing cost of the vehicle.

Figure 12:
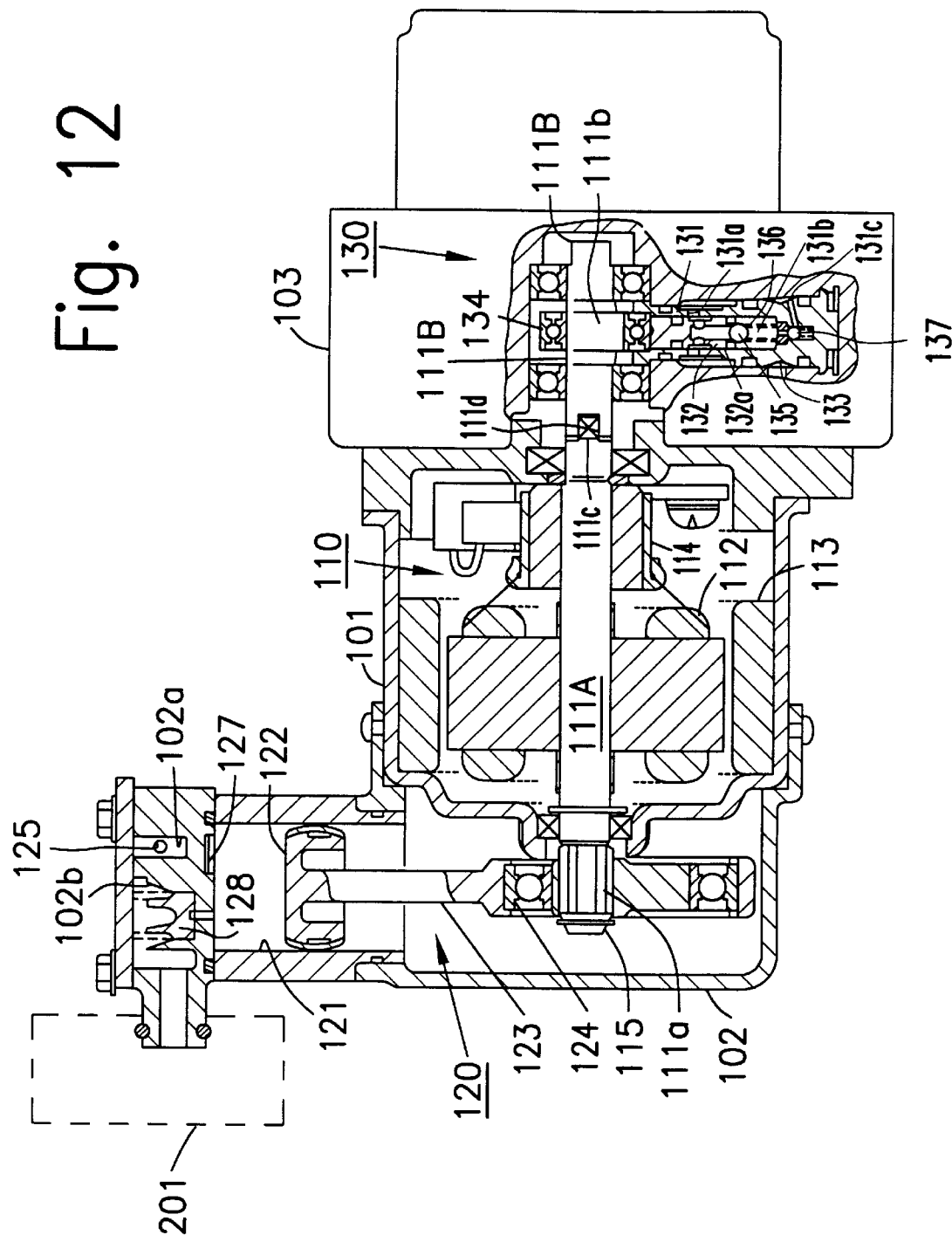
FIG. 12 is a partially broken sectional view of a modification of the assembly of the electric motor and pumps shown in FIG. 2.
Figure 13:
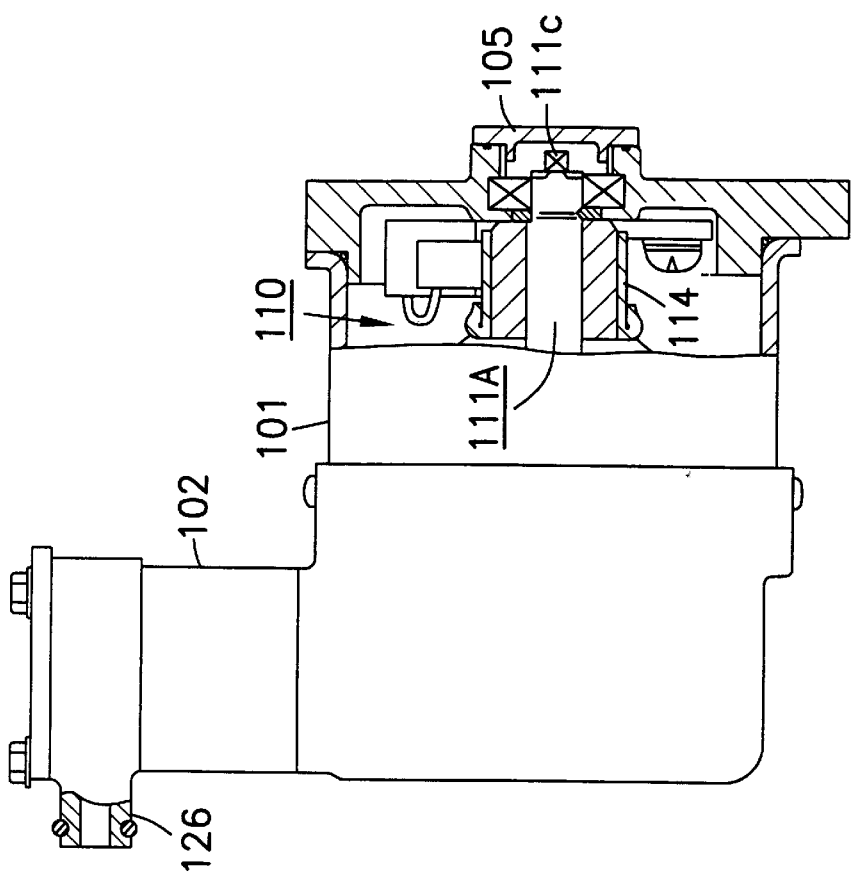
FIG. 13 is a partially broken front view of the assembly shown in FIG. 12 in a condition where the hydraulic pump is removed.

Illustrated in FIG. 12 is another modification of the assembly of the electric motor 110 and the pneumatic and hydraulic pumps 120 and 130, wherein the rotation shaft 111 of electric motor 110 is divided into first and second shafts 111A and 111B. The first shaft 111A is formed at one end thereof with a projection 111c chamfered at its opposite faces and is rotatably mounted within the first housing section 101. The second shaft 111B is formed at one end thereof with a recess 111d for engagement with the projection 111c of first shaft 111A and is rotatably mounted within the third housing section 103. During the assembly process of the hydraulic pump 130, the second shaft 111B is engaged with the projection 111c of first shaft 111A at its recess 111d for rotation with the first shaft 11A. In the case that the present invention is adapted to an automotive vehicle provided with only the hydraulic vehicle height control apparatus 200, the second shaft 111B is disengaged from the first shaft 111A so that the assembly of the third housing section 103 and hydraulic pump 130 is removed from the first housing section 101. In such an application of the present invention, the first housing section 101 is covered with a cap 105 at one end thereof as shown in FIG. 13. Thus, the electric motor 110 and the pneumatic pump 120 assembled within the first and second housing sections 101 and 102 can be used in common to the vehicle without any change in construction. This is useful to reduce the manufacturing cost of the vehicle.

What is claimed is:

1. A control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein the control system comprises a single source of driving force adapted in common to said vehicle height control apparatus and said brake control apparatus to drive both said first and second fluid pumps, a first electric control apparatus including first detection means for detecting height of the vehicle and first control means responsive to an electric signal from said detection means for activating said source of driving force and said vehicle height control apparatus in accordance with the detected height of the vehicle, and a second electric control apparatus including second detection means for detecting a rotational condition of the road wheels and movement behavior of the vehicle and second control means responsive to an electric signal from said second detection means for activating said source of driving force and said brake control apparatus in accordance with the detected rotational condition of the road wheels and the detected movement behavior of the vehicle, and wherein said first electric control apparatus further includes means for prohibiting activation of said vehicle height control apparatus for adjustment of the vehicle height while said brake control apparatus is being activated under control of said second electric control apparatus.

2. A control system of an automotive vehicle as claimed in claim 1, wherein said first electric control apparatus further includes means for exhausting fluid under pressure discharged from said first fluid pump while said brake control apparatus is being activated under control of said second electric control apparatus.

3. A control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein the control system comprises a single source of driving force adapted in common to said vehicle height control apparatus and said brake control apparatus to drive both said first and second fluid pumps, a first electric control apparatus including first detection means for detecting height of the vehicle and first control means responsive to an electric signal from said detection means for activating said source of driving force and said vehicle height control apparatus in accordance with the detected height of the vehicle, and a second electric control apparatus including second detection means for detecting a rotational condition of the road wheels and movement behavior of the vehicle and second control means responsive to an electric signal from said second detection means for activating said source of driving force and said brake control apparatus in accordance with the detected rotational condition of the road wheels and the detected movement behavior of the vehicle, and wherein said first electric control apparatus further includes means for prohibiting activation of said vehicle height control apparatus for adjustment for rising of the vehicle height while said brake control apparatus is being activated under control of said second electric control apparatus.

4. A control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein the control system comprises a single source of driving force adapted in common to said vehicle height control apparatus and said brake control apparatus to drive both said first and second fluid pumps, a first electric control apparatus including first detection means for detecting height of the vehicle and first control means responsive to an electric signal from said first detection means for activating said source of driving force and said vehicle height control apparatus in accordance with the detected height of the vehicle, and a second electric control apparatus including second detection means for detecting rotation of the road wheels and second control means responsive to an electric signal from said second detection means for activating said source of driving force and said brake control apparatus when the road wheels tend to be locked or slip, and wherein said first electric control apparatus further includes means for prohibiting activation of said vehicle height control apparatus for adjustment of the vehicle height while said brake control apparatus is being activated under control of said second electric control apparatus.

5. A control system of an automotive vehicle as claimed in claim 3, wherein said first electric control apparatus further includes means for exhausting fluid under pressure discharged from said first fluid pump while said brake control apparatus is being activated under control of said second electric control apparatus.

6. A control system of an automotive vehicle as claimed in claim 1, wherein said source of driving force is an electric motor, said first fluid pump is a pneumatic pump, and said second fluid pump is a hydraulic pump.

* * * * *